United States Patent [19]
Talmadge

[11] Patent Number: 4,858,138
[45] Date of Patent: Aug. 15, 1989

[54] SECURE VAULT HAVING ELECTRONIC INDICIA FOR A VALUE PRINTING SYSTEM

[75] Inventor: Paul C. Talmadge, Ansonia, Conn.

[73] Assignee: Pitney Bowes, Inc., Stamford, Conn.

[21] Appl. No.: 902,903

[22] Filed: Sep. 2, 1986

[51] Int. Cl.⁴ .................. G07B 17/00; G06F 15/20
[52] U.S. Cl. .................. 364/464.02; 364/200; 364/222.2; 364/256.8; 364/900; 364/919
[58] Field of Search ........... 364/200, 464, 900, 464.02; 370/42, 62, 68

[56] References Cited

U.S. PATENT DOCUMENTS

| | | | |
|---|---|---|---|
| 3,702,464 | 11/1972 | Castrucci | 235/492 |
| 3,890,599 | 6/1975 | Simjian | 340/825.34 |
| 3,990,558 | 11/1976 | Ehrat | 194/206 |
| 4,097,923 | 6/1978 | Eckert, Jr. et al. | 364/900 |
| 4,124,891 | 11/1978 | Weller, III et al. | 364/200 |
| 4,146,778 | 3/1979 | Wain | 235/92 AC |
| 4,168,533 | 9/1979 | Schwartz | 364/900 |
| 4,218,011 | 8/1980 | Simjian | 235/375 |
| 4,222,518 | 9/1980 | Simjian | 235/375 |
| 4,226,360 | 10/1980 | Simjian | 235/375 |
| 4,249,071 | 2/1981 | Simjian | 235/375 |
| 4,253,158 | 2/1981 | McFiggons | 364/900 |
| 4,258,252 | 3/1981 | Simjian | 235/432 |
| 4,268,817 | 5/1981 | Simjian | 340/147 A |
| 4,285,050 | 8/1981 | Muller | 364/900 |
| 4,317,028 | 2/1982 | Simjian | 235/380 |
| 4,377,214 | 3/1983 | Hansen et al. | 364/464.03 X |
| 4,422,148 | 12/1983 | Soderberg et al. | 364/464 |
| 4,436,992 | 3/1984 | Simjian | 235/381 |
| 4,458,109 | 7/1984 | Mueller-Scholer | 178/22.1 |
| 4,476,542 | 10/1984 | Crean et al. | 364/900 |
| 4,481,604 | 11/1984 | Gilham et al. | 364/900 |
| 4,520,455 | 5/1985 | Crean et al. | 364/900 |
| 4,629,871 | 12/1986 | Scribner et al. | 235/375 |
| 4,649,266 | 3/1987 | Eckert | 235/494 X |
| 4,725,718 | 2/1988 | Sansone et al. | 235/375 X |
| 4,775,246 | 10/1988 | Edelmann et al. | 380/23 |

Primary Examiner—Parshotam S. Lall
Assistant Examiner—Edward R. Cosimano
Attorney, Agent, or Firm—Donald P. Walker; Melvin J. Scolnick; David E. Pitchenik

[57] ABSTRACT

A value printing system is disclosed which provides for storing the indicia to be printed within a secure vault module. The vault module also provides for securely maintaining the system accounting data. Coupled to the vault module is a host module which in turn is coupled to a printer module, whereby the indicia are printed. The vault module and the host module are coupled together by a high speed communications bus which utilizes a memory interchange, or swapping, technique to transfer blocks of data bidirectionally between the vault and the host.

24 Claims, 11 Drawing Sheets

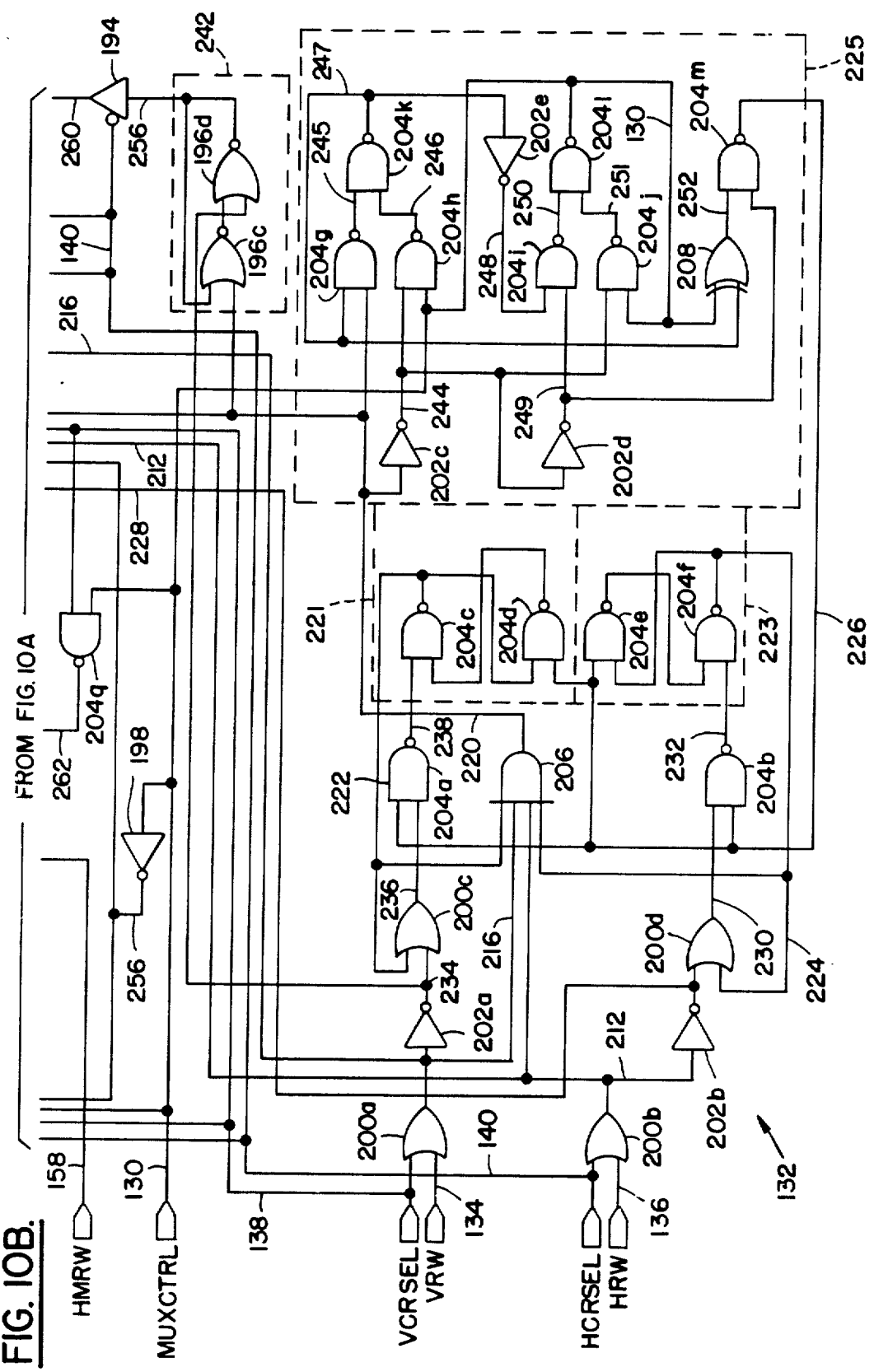

SECURE VAULT HAVING ELECTRONIC INDICIA FOR A VALUE PRINTING SYSTEM

BACKGROUND OF THE INVENTION

A. Field of the Invention

This invention relates generally to value printing systems having a modular form and, particularly, to a system wherein the secure metering device module, which contains the accounting registers for recording the values of printed indicia, also contains a representation of the indicia stored in electronic form. For example, in a modular postage printing system, wherein the secure metering module is separable from the printing module, an even greater degree of security is attained by storing within the metering module a representation of the indicia to be printed. Thus, not only must the metering module provide the printing module with permission to print the indicia, the metering module must also provide a representation of the indicia itself.

B. Prior Art

A postage meter typically includes a printer to print postal information on a mail piece. Postage meters of this type are described in a U.S. patent issued to Alton B. Eckert, Jr., Howel A. Jones, Hr. and Frank T. Check, Jr., entitled "A Remote Postage Meter Charging System Using an Advanced Micro-Computerized Postage Meter" issued on June 27, 1978, U.S. Pat. No. 4,097,923. Another example of a meter that utilizes a printer is described in U.S. Pat. No. 4,422,148 issued to John H. Soderberg and Alton B. Eckert, Jr. and Robert B. McFiggans entiled "Electronic Postage Meter Having Plural Computing Systems" issued on Dec. 20, 1983.

Postal meters of above-described form may be provided with several modifications. For example, in one modification, a remote charging feature is available whereby a key is provided for operation of a three position charging switch on the keyboard. The operator of the unit may thus be provided with suitable combinations for entry into the keyboard to enable remote charging. In a further modification the three position charging switch on the keyboard may be controlled by a simple knob without the necessity of the key. In this type of system, the meter may be manually recharged at the post office, but the service function may be affected locally in a manner similar to that of the remote charging system type units.

The postage meters above described all contain printers that are an integral part of the meter itself. Although these meters as above described serve their intended purpose in an exemplary fashion it is always important to develop new and improved postage metering devices to decrease cost and improve speed and efficiency.

As is well known, in a typical system the postage meter will contain the printing apparatus to facilitate applying postage to a mail piece of the like. The printing apparatus located within the postage meter adds to the cost and the complexity of the meter.

One such postal metering device which does not contain an integral printer is disclosed in a copending application No. 832,904, filed Feb. 25, 1986 entitled "System For Detecting Unaccounted For Printing In A Value Printing System", to G. Edelman et al, now U.S. Pat. No. 4,703,333, wherein a metering device provides a validation signal to a host having an attached printer. Thereafter the printer prints information which includes information from the validation signal.

Typically, in an electronic postal mailing system it is important that the postal funds within the meter are secure. What is meant by the funds being secure is that when the printer prints postage indicia on a mail piece, the accounting register within the postage meter always should reflect that the printing has occurred. In typical postal mailing systems, since the meter and the printer are integral units, both are interlocked in such a manner as to insure that the printing of a postage indicia cannot occur without accounting. Postal authorities generally require the accounting information to be stored within the postage meter and to be held there in a secure manner, thus any improved postal mailing system should include security features to prevent unauthorized and unaccounted for changes in the amounts of postal funds held in the meter. Postal authorities also require that meters be put in service and removed from service in strict compliance with their requirements for registration and periodic (say, for example, every 6 months) inspection. This enables the Post Office to keep records on the usage of a meter and detect fraud. Thus, there are also administrative costs associated with the record keeping, inspection and servicing of meters.

There is a continuing need for less expensive and higher speed postage meters. As before-mentioned, typically a postage meter has associated with it different peripherals that add to the cost thereof. It is important to develop postage meters that can be adaptable to postal mailing systems which are less expensive and more efficient, but will also be able to maintain the high level of security associated with the above-mentioned postage meters. It is also important that any new postal mailing system developed be one in which security can be maintained in a manner in keeping with the previously mentioned mailing systems.

SUMMARY OF THE INVENTION

The foregoing objects are realized in accordance with the present invention wherein a value printing system is provided having a storage means for storing a representation of the indicia to be printed, the storage means being disposed within a secure vault module. The vault module also provides for securely maintaining the system accounting data. Coupled to the vault module is a host module which in turn is coupled to a printer module, whereby the indicia are printed. The vault module and the host module are communicatively coupled together by a high speed communications bus which employs a memory interchange, or swapping, technique to transfer blocks of data bidirectionally between the vault and the host.

In an illustrative embodiment, a high speed electronic postal mailing system is disclosed which includes an electronic postage meter which comprises an accounting unit. The accounting unit is comprised of a processing unit, in this embodiment a microcomputer, a non-volatile memory (NVM) and a NVM data protection unit connected to the microcomputer. In addition, there is also connected to the microcomputer an indicia memory, wherein a representation of the fixed pattern of the postage indicia is stored in digital form.

The postage meter provides a capability of generating an encrypted validation number and the fixed pattern of the indicia for printing on a document. This generated validation number provides a method for detection of unaccounted printing and supplies the postal authorities with information on the meter accounting registers. The high speed printer of this embodiment would be located within the mailing machine or some other host which would also be a part of the mailing system.

The host or mailing machine of this embodiment comprises principally a second microcomputer, and a high speed printer. The meter is able to communicate over a high speed, secure data bus with the mailing machine or host to perform all the accounting functions, to accept funds, reset to zero for removal from service and any other actions that electronic postal mailing systems generally perform. The meter is also able to communicate with the host to provide a digital representation of the fixed pattern of the postage indicia itself. In addition, it is advantageous in this meter to use security techniques which are used in existing meters, such as a mechanically secure enclosure and electromagnetic shielding, isolating power supply and isolating communication links.

The electronic postage meter of this embodiment, as before-mentioned, does not print postage but supplies an electronic signal which will represent an encrypted validation number for the postage amount that it accounts for and, in addition, a digital representation of the fixed portion of the postage indicia. In this embodiment the encrypted validation number is to be printed along with a dollar amount, the meter serial number and the date of issue. The validation number is typically printed in a system approved format that would be appropriate for automatic detection if required. This encrypted validation number is used to detect illegal printing of a dollar amount that has not been accounted for.

In this illustrative embodiment the mailing machine's processing unit would receive a dollar amount from a keyboard or the like and would send that information to the processing unit of the meter. The meter would thereafter generate an encrypted validation number using a key and plain text supplied by the processing unit of the meter. The plain text would be the postage information and meter accounting registers of the meter. It should be recognized that other information such as date, origin of the document, destination, etc., can also be used depending on the need and desires of user. The key would be internally stored within the NVM.

The meter would then send the validation number along with the meter serial number and a representation of the fixed pattern of the postage indicia to the processing unit of the mailing machine or host. The processing unit within the host thereafter sends the postage indicia, meter serial number, dollar amount and validation number to a printer. The printer, in turn, prints the postage indicia, date, meter serial number, dollar amount and validation number on a mailpiece or document.

Thus, in this illustrative embodiment a microcomputer within the meter would be in communication with a microcomputer within a mailing machine or some other type of host unit. In this system, the postage meter would supply an electronic signal which represents an encrypted validation number and the fixed portion of the postage indicia to the mailing machine. After receiving the appropriate signal from the postage meter, the mailing machine would signal its printer to print the postage indicia including the desired postage amount.

The postage meter of this embodiment contains no printer thereby making it less complex and less expensive. In addition, a postage meter of this type could be adapted to a wide variety of mailing machines or other peripheral units. The encryption scheme utilized to protect the validity of the postage indicia can be any of a variety of schemes known to those skilled in the art including, for example, those that have been used typically to protect the accounting information located within the meter.

Therefore, this system provides for a less expensive and simpler postage meter which could be adapted to a wide variety of mailing machines. This system also allows for a postage meter which is completely separated from the printing function in which only an electrical signal representing the fixed pattern of the meter serial number and the postage indicia, and validation number is supplied to a peripheral device, i.e., a mailing machine with a printer. This system also makes it much easier for the post office or other agency to detect fraud by making is possible to keep more accurate and up-to-date records on usage of each meter.

The system of the invention also provides for the rapid printing of postage indicia by the utilization of a high speed, secure communications bus between the meter and the host and, additionally, by the use of a high speed printer, such as in ink jet printer.

BRIEF DESCRIPTION OF THE DRAWINGS

The above-mentioned and other features of the invention will become better understood with reference to the following detailed descriptions when taken in conjunction with the accompanying drawing, wherein like reference numerals designate similar elements in the various figures, and in which:

FIGS. 10a and 10b, referred to herein as FIG. 10, are a schematic diagram of yet another portion of the Inter-CPU Interface of FIG. 6.

DETAILED DESCRIPTION

The invention is disclosed in the context of a postage meter, however, other types of meters may have the invention applied thereto with equal success. Such other types of meters include parcel service meters, tax stamp meters, check writing meters, ticket imprinters, and other similar devices.

Cross reference is hereby made to two related patent applications which are incorporated herein by reference in their entireties; an application entitled "A Secured Printer For A Value Printing System" by Paul T. Talmadge et al, Ser. No. 902,904, filed on Sept. 2, 1986, now U.S. Pat. No. 4,813,912 and an application entitled "Secure Metering Device Storage Vault For A Value Printing System" by Paul Talmadge, Ser. No. 902,844, filed on Sept. 2, 1986, now U.S. Pat. No. 4,809,154.

Figure 1:
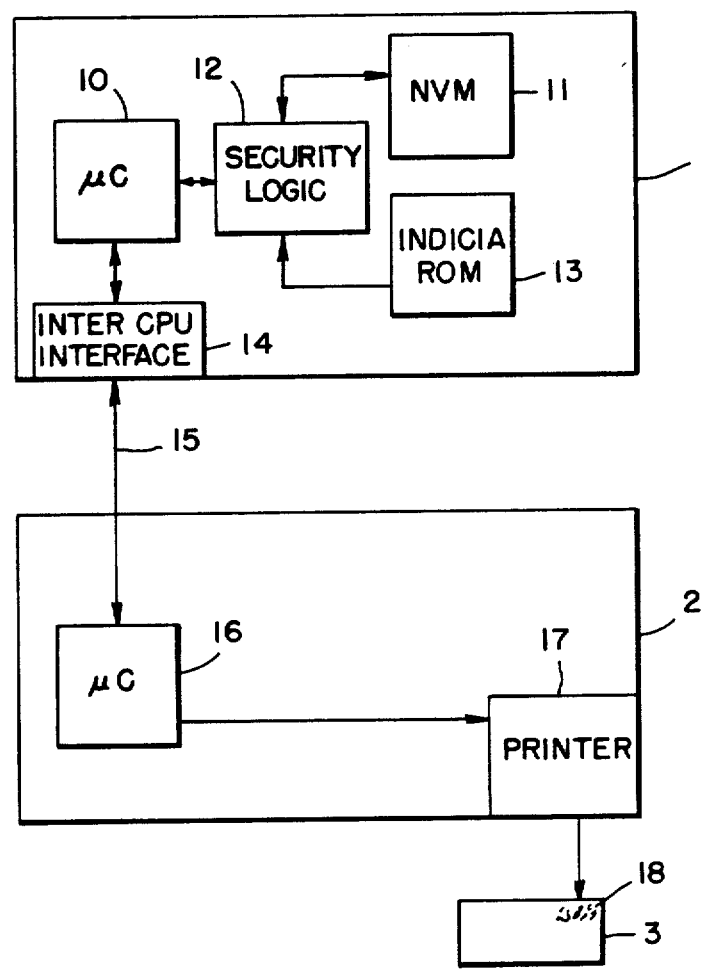
FIG. 1 is a block diagram of the electronic postal mailing system.

FIG. 1 shows in block diagram form a mailing system in accordance with the invention. The mailing system invention is comprised of the postal meter 1, also referred to herein as an electronic vault or as a vault, which is in communication with the host 2. The host 2, typically, is a mailing machine but can also be a variety of other devices which could communicate with the meter. The host 2, in turn, prints a postage indicia 18 including a postage amount along with other information on a document 3 by means of a printer 17.

The meter 1 comprises in this embodiment of the invention a processing unit or microcomputer 10 which is coupled to a non-volatile memory (NVM) 11 through security logic 12. The processor unit, for example, can be a microprocessor, a microcontroller, microcomputer, or other intelligent device which provides processing capability, hereinafter referred to as either a processor, microcomputer or microprocessor. The meter 1 of this embodiment does not have a printer associated therewith and instead, provides electronic signals which represent, typically, the validation number and the fixed pattern of the postage indicia to the host 2.

As can be also seen, the host 2 comprises a second processing unit or microcomputer 16 and may include the printer 17. The printer may also be a separate unit. The microcomputer 16 provides intelligence to allow for the communication back and forth, via bidirectional lines 15 and interface 14, to microcomputer 10 of the meter and to the printer 17 to initiate printing when the proper information is given thereto.

Typically, a keyboard or the like (not shown) sends the information representing the postage amount to microcomputer 16. Thereafter, the microcomputer 16 sends a signal to microcomputer 10 consisting of the postage amount to obtain a validation number for printing.

The microcomputer 10 after receiving a signal from microcomputer 16 will compute an encrypted validation number based in part on a key stored within the NVM 11. Access to the NVM 11 is gained through security logic 12 which provides for ensuring the data integrity of the accounting, encryption, and other data stored within NVM 11. The validation number, by way of example, may be computed by combining the serial number of the postage meter and a secret code stored within the NVM 11.

The validation number will thereafter be transmitted to the microcomputer 16 of the host 2 along with a representation of the fixed pattern of the postal indicia 18, stored in an indicia ROM 13, to initiate the printing process. The printer, as before-mentioned, in turn will print on the document 3 the information communicated from the microcomputer 16. Thus, the meter provides to the host 2 the fixed pattern of the postage indicia, the meter serial number, and the validation number to be printed on document 3. The host 2 provides the postage amount.

In this embodiment, either the host 2 or the meter 1 can provide the city, state and date information.

Figure 2:
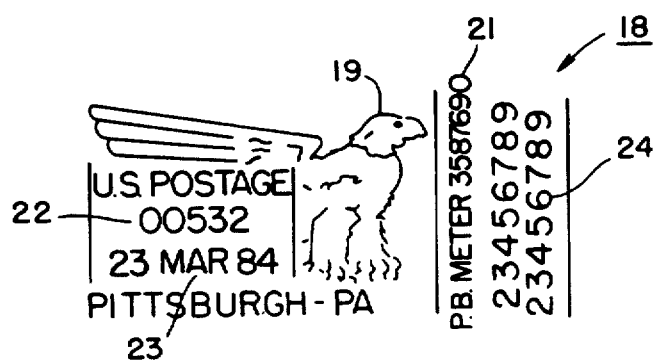
FIG. 2 shows the postage indicia printed by the postal mailing system of FIG. 1.

Referring now to FIG. 2, the indicia 18 may be seen to have a graphical, fixed pattern 19, a dollar amount 22, a data and a city of origin 23 and a meter serial number 21. In addition, the indicia 18 will include a validation number 24. Pattern 19 is said to be fixed inasmuch as it is not necessary to determine it for each indicia printed, unlike the amount 22. As may be appreciated, although the pattern 19 is shown in FIG. 2 to have the form of a graphical representation of an eagle, a variety of predetermined, distinctive patterns could be used, depending on the particular application of a value printing system embodying the invention.

Figure 3:
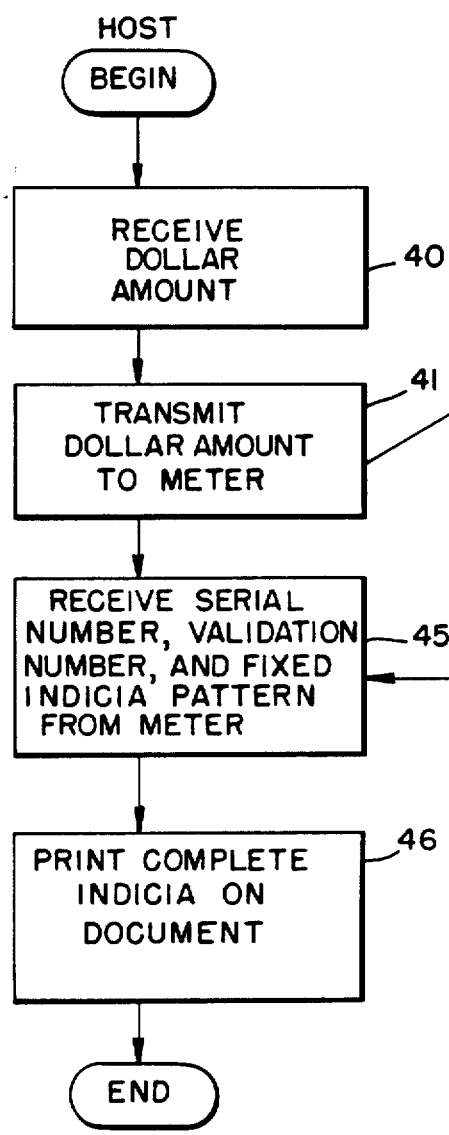
FIG. 3 is a flow chart of the operation of the host of the postal mailing system of FIG. 1.
Figure 4:
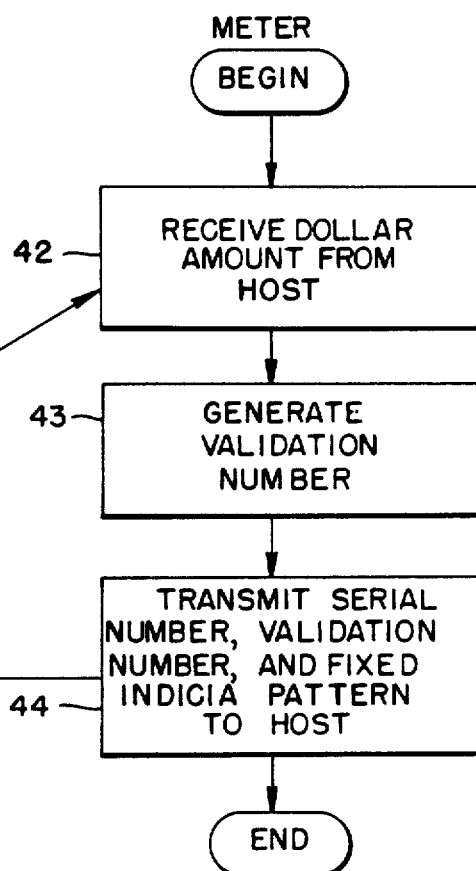
FIG. 4 is a flow chart of the operation of the meter of the postal mailing system of FIG. 1.

FIGS. 3 and 4 are flow charts describing the operation of the postal mailing system. Initially the host 2 (FIG. 1) will receive a required postage dollar amount from a source, whether that be an operator or some other source, indicated by box 40. Thereafter, the dollar amount is transmitted to the meter 1 (FIG. 1), box 41. Referring to FIG. 4, the meter will then receive that dollar amount from the host 2, box 42, and will thereafter generate a validation number, box 43. After generating the validation number, the meter 1 will thereafter transmit the meter serial number, the validation number, which includes postal information, and the fixed portion of the indicia back to the host 2, box 44. Referring back to FIG. 3, the host 2 will then receive the meter serial number, validation number, and fixed portion of the indicia from the meter, box 45. Thereafter the printer 17 (FIG. 1) will print on the document 3 the fixed portion of the postage indicia 19, the dollar amount 22, the date 23, the meter serial number 21, and the validation number 24 received from the meter 1, box 46.

Inasmuch as a stated purpose of the postage meter of the invention is to provide for the high speed printing of postage indicia on documents, the transfer of data between meter 1 and host 2 must be accomplished in a high speed and efficient manner. This requirement may be made even more evident by considering the representation of the fixed pattern 19 of the postage indicia 18 stored in the indicia ROM 13 of FIG. 1.

Typically, a postage indicia represented in a format suitable for printing by a dot matrix type of printing device has a standard size of one inch by two inches and is comprised of 240 columns each having 120 dots, each dot possibly having one of three levels of intensity. The total number of bits required to represent such a dot matrix type of indicia may be 68,400, or approximately 10,800 bytes. As may be appreciated, if the postage indicia is supplied to the host 2 for each document printed, a considerable amount of data must be rapidly transferred between meter 1 and host 2, especially considering that in a high speed postage metering system three or more documents may be so printed every second.

In addition to the requirement for a high speed data communications bus linking the meter 1 and the host 2, such a high speed dot matrix printing requirement necessitates the use of a suitable high speed printer. Such a printer must, in addition to having a capability for high speed operation, be capable of providing a print quality and other print characteristics which make it suitable for printing postage and other valuable indicia. One such suitable printer is an ink jet printer, wherein droplets of ink are electrostatically deflected at high speeds by electronically controlled deflection plates, as is well known in the art.

Figure 5:
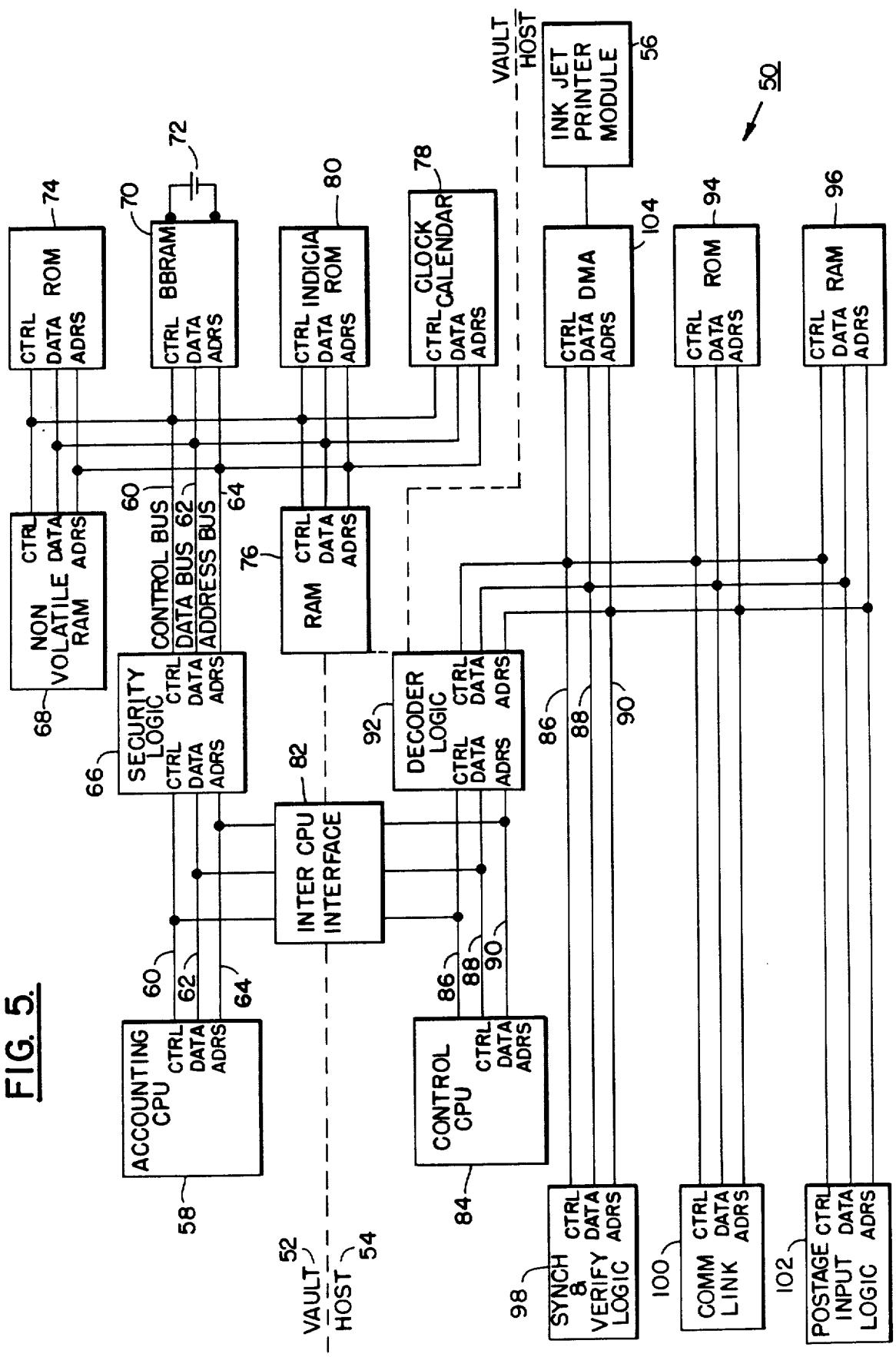
FIG. 5 is a block diagram of one embodiment of the postal mailing system.

Referring now to FIG. 5 there is shown in block diagram form one embodiment of a high speed, modularized postage metering system 50. System 50, as shown, is comprised of three main modules, those being a secure metering module, or Vault 52, a print control module, or Host 54, and an inkjet printer module 56.

Vault 52 is further comprised of an Accounting CPU 58, which may be a microprocessor such as the Z-80 manufactured by the Zilog Corporation and other manufacturers.

As is well known, such a microprocessor has a bus structure characterized by a control bus 60, a data bus 62, and an address bus 64. The purpose of the busses is to control, identify, and transfer program instructions and data to and from memory and input/output (I/O) devices connected to the busses.

Connected to the busses 60, 62 and 64 is a Security Logic 66 circuit which monitors the addresses generated by CPU 58 in order to control the memory accesses made to two random access memories (RAM) wherein the meter accounting data is stored; those memories being nonvolatile RAM (NOVRAM) 68 and battery backed-up RAM (BBRAM) 70. Coupled to BBRAM 70 is a battery 72 having a voltage suitable for maintaining the data stored within BBRAM when the power is removed from system 50. As is well known in the art, a nonvolatile RAM such as NOVRAM 68 has the characteristic of maintaining the data stored within after the removal of power from the RAM.

A security logic circuit that could be utilized for the Security Logic 66 is disclosed in U.S. patent application Ser. No. 710,802 entitled A POSTAGE METER WITH A NON-VOLATILE MEMORY SECURITY CIRCUIT filed on Mar. 12, 1985, and assigned to the assignee of the subject application now abandoned and replaced by application Ser. No. 122,580, filed Nov. 16, 1987. The circuit disclosed in this application provides means for limiting the amount of time that the accounting memories may be continuously enabled and also provides other protective mechanisms so that the valuable accounting information stored therein cannot be inadvertently modified or destroyed.

The use of two separate memories for holding the accounting information is described in U.S. Pat. No. 4,481,604, wherein such memory redundancy is utilized to minimize the possibility of error conditions occuring in an electronic postage meter.

Also connected to CPU 58 by the busses 60, 62 and 64 are a program storage read only memory (ROM) 74 wherein the operating instructions and constants required by CPU 58 are stored. An RAM 76 is also provided to store temporary data and other information required by CPU 58 during the execution of its normal operating program. As is well known, such a device is commonly referred to as a "scratchpad" RAM.

Also connected to CPU 58 is a clock/calendar device 78 which provides for maintaining the current time and date information. Such information is required, typically, for printing as a part of the postage indicia. In this embodiment of the invention Vault 52 will provide the current time and date to Host 54 for printing. As may be appreciated, the clock/calendar device 78 could alternatively be contained within Host 54, thereby reducing the amount of data which must be provided by Vault 52 to Host 54 for each postage indicia printed. In a still further embodiment of the invention, both the Vault 52 and Host 54 would each contain such a clock/calendar device. Appropriate software routines in each of the Vault 52 and Host 54 could then be utilized, before the printing of a postage indicia, to verify that the time and date in each module are in agreement, thereby providing a still further degree of security.

In addition to the above described devices connected to the busses 60, 62 and 64 there is provided an indicia ROM 80. In accordance with the invention, ROM 80 has permanently stored within a representation, or copy, of the fixed pattern 19 (shown in FIG. 2) of the postage indicia 18. As was described above, in this embodiment of the invention fixed pattern 19 is stored as a series of data bytes representative of the dot matrix pattern required to print fixed pattern 19. The bytes of data representative of this fixed pattern 19 may be provided to Host 54 by Vault 52 for each postage indicia printed. Thus a high degree of security is achieved in the use of the system 50 in that the graphical format of the postage indicia cannot be purposely or inadvertently reproduced by Host 54 unless the Vault 52 is attached thereto and, additionally, unless the required communication between the two modules is accomplished in a predefined and specific manner. Thus, the accounting by Vault 52 of each postage indicia printed is assured.

As may be appreciated, the implementation of this aspect of the invention may be carried out in a variety of suitable ways. For example, the fixed pattern 19 may be stored within ROM 80 in a scrambled or encrypted manner in order to provide an even greater degree of security. As another example, the fixed pattern 19 could be stored within ROM 80 as a predetermined sequence data suitable for generating the graphical pattern of the indicia when the data is operated on by a mathematical formula stored within Vault 52 or Host 54.

As a still further example of the use of this aspect of the invention, the indicia representation within ROM 80 may be provided by Vault 52 to Host 54 for storage. The indicia representation would be provided once when the system 50 is first energized and prepared for use. Thus, since the Host 54 would retain a copy of the indicia during the use of system 50, the amount of data required to be transferred during each indicia printing operation would be significantly reduced.

In order to provide an efficient and high speed means for transferring the possibly large amount of data between Vault 52 and Host 54, a high speed data communications means is required. This communications means is provided by an Inter-CPU Interface 82 which couples CPU 58 to a control CPU 84 within Host 54. The operation of the Inter-CPU Interface 82 will be described in detail hereinafter.

The function of CPU 84 is to control the printing, of postage indicia on a document (not shown in FIG. 5) by printer module 56 in response to document position and system timing inputs provided by a mailing machine (not shown) coupled to Host 54. Such mailing machines typically are comprised of document feeders and conveyors and function to collate documents for insertion within an envelope, the envelope then being printed with the correct postage, having a predetermined, given value. In a high speed mailing machine there may be three or more envelopes per second which require the printing of postage thereon. Such high speed operation necessitates that CPU 84 operate in a "real time" environment and, hence, be of a suitable type for this operation. One suitable type of microprocessor for such a demanding application is a member of the 68000 family of microprocessors, such microprocessors being manufactured by the Motorola Corporation and other manufacturers.

Connected to CPU 84 are a plurality of busses, namely a control bus 86, a data bus 88 and an address bus 90 for coupling CPU 84 to a plurality of memory and I/O devices.

A decoder logic 92 block operates to decode the address 90 and control 86 busses, in a well known manner, in order to generate one of a plurality of device select signals (not shown) for activating a proper one of the devices connected to the busses 86, 88 and 90 of CPU 84.

An instruction ROM 94 contains the operating instructions and constants required by CPU 84 to carry out its function of controlling the printing of postage indicia. Scratchpad RAM 96 is utilized by CPU 84 to contain variable and temporary data required for operation.

In order to provide CPU 84 with a means to communicate with the mailing machine and other external devices a Synch and Verify Logic 98 block and a Postage Input Logic 102 block are provided. The purpose of the Sync and Verify Logic 98 is to provide CPU 98 with inputs from the mailing machine (not shown), such inputs being representative of timing and position information relating to the documents being processed by the mailing machine. In addition, Synch and Verify Logic 98 provides for outputting the required control signals from CPU 84 to the mailing machine (not shown).

Postage Input Logic 102 block provides for inputting data representative of the dollar amount of postage required by each document. This input may be provided by, for example, an operator keyboard or the output of a document weighing machine. The amount of postage required by each document is provided by CPU 84 to CPU 58, as has been previously described, in order that Vault 52 may make an accounting of the amount.

In addition to the above described logic blocks, a Comm Link 100, or communications logic block, is provided for interfacing CPU 84 to other devices by way of a standard communications link, such as RS-232-C or IEEE-488 or some other general purpose serial or parallel communications channel. As examples of devices that may be connected to Comm Link 100 are a printer for printing system status and accounting information or a modem for allowing telephonic communications with a central computer, such as a postal facility accounting computer.

In order to provide CPU 84 with the ability to perform one of its basic functions, that is the printing of postage indicia, a high speed direct memory access (DMA) 104 device is provided to couple the busses 86, 88 and 90 to the Inkjet Printer Module 56. As is well known, such a DMA device typically functions to transfer data, without the intervention of the system microprocessor, between an I/O device, such as Module 56, and the microprocessor memory.

In operation, CPU 84 may temporarily store within RAM 96 the data bytes representative of the fixed pattern of the postage indicia provided by Vault 52 and, additionally, data representative of the variable portions such as the postage amount 22 and date 23 (as shown in FIG. 2). The complete indicia would thereby be represented as a plurality of bytes descriptive of, for example, the dot matrix pattern required to form the indicia 18. DMA 104, after activation by CPU 84, functions to automatically provide MODULE 56 with indicia dot matrix data from RAM 96 for printing on a document.

As has been previously described, an aspect of this embodiment of the invention is the ability to rapidly transfer large blocks of data, such as the dot matrix representation of the fixed portion 19 of the postage indicia 18, from Vault 52 to Host 54. As will herein be described, the invention has a data block transfer means which employs a RAM memory interchange, or swapping, technique.

Figure 6:
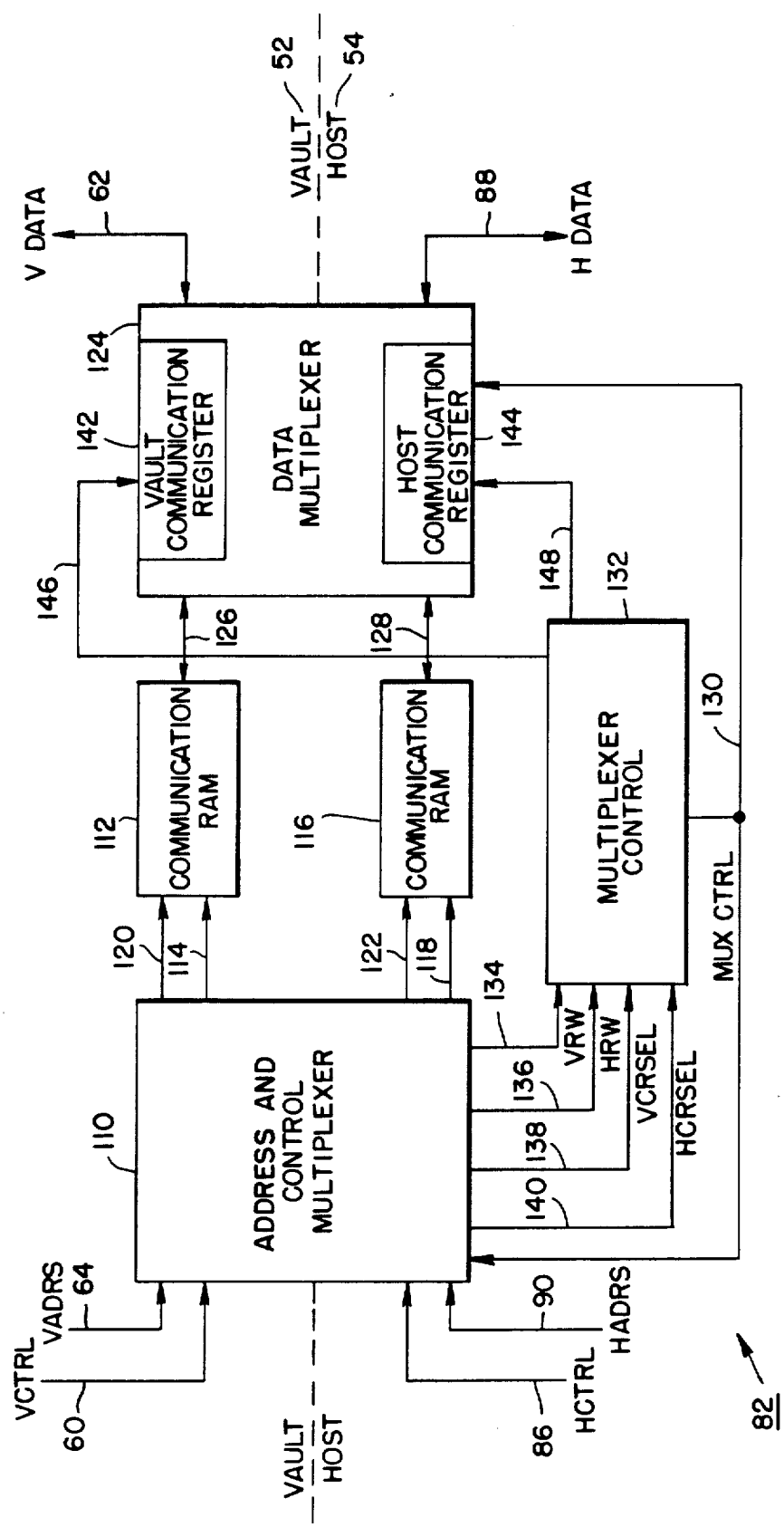
FIG. 6 is a block diagram of the Inter-CPU Interface of FIG. 5.

Referring now to FIG. 6 there is shown in block diagram form the Inter-CPU Interface 82 of FIG. 5. Interface 82 is comprised of an address bus and control bus Multiplexer 110 for controllably connecting the Vault 52 control bus 60 (VCTRL) to either a first communication RAM 112 control bus 114 or a second communication RAM 116 control bus 118 and, additionally, for simultaneously connecting the vault 52 address bus 64 (VADRS) to either the RAM 112 address bus 120 or the RAM 116 address bus 122.

Multiplexer 110 is further operable for simultaneously connecting the Host 54 control bus 86 (HCTRL) to either the RAM 112 control bus 114 or the RAM 116 control bus 118 and, additionally, for simultaneously connecting the host 54 address bus 90 (HADRS) to either the RAM 112 address bus 120 or the RAM 116 address bus 122. As may be appreciated, Multiplexer 110 operates such that when the Vault 52 is connected to RAM 112, the Host 54 is connected to RAM 116 and, alternately, when the Vault 52 is connected to RAM 116, the Host 54 is connected to RAM 112. A data Multiplexer 124 operates in a similar fashion to connect the Vault 52 data bus 62 (VDATA) to a data bus 126 of RAM 112 or to a data bus 128 of RAM 116. The Host 54 (HDATA) data bus 88 is similarly connected to either RAM 112 or RAM 116. The Multiplexers 110 and 124 are controlled by a MUXCTRL 130 signal which is generated by a Multiplexer Control 132 logic block. Control 132 is responsive to inputs VRW 134 (vault read/write), HRW 136 (host read/wrote), VCRSEL 138 (vault communication register select) and HCRSEL 140 (host communication register select), the input activating Control 132 to interchange RAMS 112 and 116 between the Vault 52 and Host 54. To facilitate this interchange of RAMS 112 and 116 a one byte vault communication register 142 (VCR) and a one byte host communication register 144 (HCR) are provided. VCR 142 is operable to be written to by Host 54 and read by Vault 52. HCR 144 is operable to be written to by Vault 52 and ready by Host 54.

Typically, both the Vault 52 and Host 54 read their respective communication registers to determine if a seven bit status code has been written therein by other. The eighth bit of each communication register indicates the current state of Control 132 relative to a memory interchange cycle, as will be described in detail hereinafter. The status code, for example, may be descriptive of the type of data that has been stored within one of the RAMS 112 or 116. If, for example, a status code is detected by the Host 54 that indicates that the Vault 52 has stored a block of data within one of RAMS 112 or 116, the Host 54 would respond by writing to VCR 142. The writing is accomplished by Control 132 activating line 146. Assuming that Vault 52 had previously written to HCR 144 a RAM memory interchange, or swap, would be automatically accomplished by Control 132. If Vault 52 had not yet written to HCR 144, the swap would remain pending until the Vault 52 writes to HCR 144. Writing to HCR 144 is accomplished by Control 132 activating line 148. After the swap is accomplished by Control 132 the RAM that had previously been loaded with data by Vault 52 would be connected to Host 54, thus enabling Host 54 to read the data contained therein.

In accordance with a method of transferring a data block between two processing means, which method is a feature of the invention, a summary of the above described operation of Inter-CPU Interface 82 will now be presented. Referring to FIG. 7 and, in particular, to FIG. 7a, Vault 52 first loads a block of data 107, which data may be the dot matrix representation of the fixed pattern of the postage indicia, into, for example, RAM 112. A block of data may be comprised of from one byte to the number of bytes which may be stored within the RAM 112 which in this embodiment is 2047 bytes. The data 107 is loaded via the VCTRL 60, VADRS 64 and VDATA 62 busses (shown collectively as bus 109), the bus 109 being coupled through the Multiplexer 110 and Multiplexer 124, shown schematically in FIG. 7a as switches 111, to the address 120, control 114 and data 126 busses of RAM 112, shown collectively as bus 113.

Figure 7A:
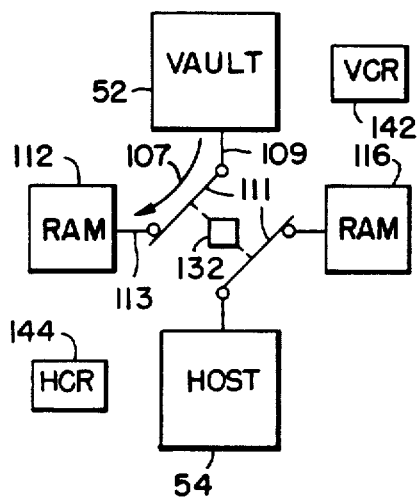
FIGS. 7a, 7b, 7c and 7d are each a block diagram showing the interaction of the Vault, the Host and the Inter-CPU Interface of FIG. 5.
Figure 7B:
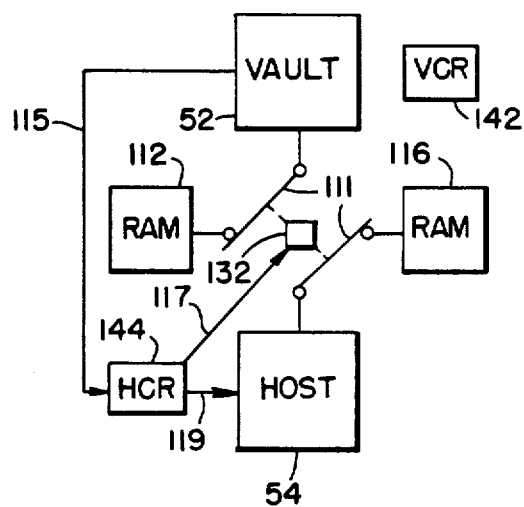

Referring now to FIG. 7b, after writing the data 107 into RAM 112 Vault 52 writes an appropriate communication code, as indicated by the line 115, into HCR 144. The writing of the communication code 115 is sensed by Control 132, as indicated by line 117, thereby arming Control 132 to respond to a subsequent write to VCR 142 by Host 54. Additionally, the communication code written by Vault 52 to HCR 144 is available thereafter to be read by Host 54, as indicated by line 119.

Figure 7C:
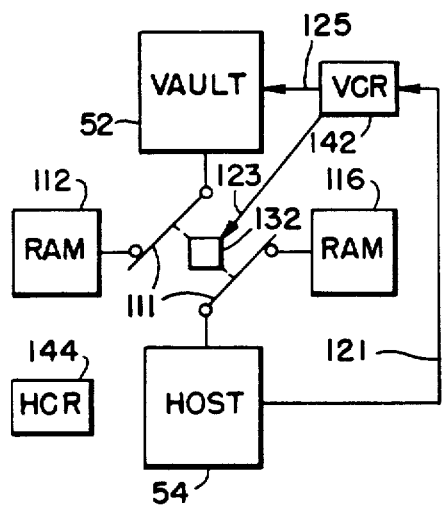

Referring now to FIG. 7c, after reading the communication code written into HCR 144 the Host 54 responds by writing an appropriate communication code into VCR 142, as indicated by the line 121. The writing of this communication code 121 is sensed by Control 132, as indicated by the line 123. Inasmuch as Control 132 was previously armed by the line 117, Control 132 is activated to reverse the multiplexer 111 connections upon the termination of the code 121 write cycle. Additionally, the code 121 written by Host 54 to VCR 142 is available thereafter to be read by Vault 52, as indicated by line 125.

Figure 7D:
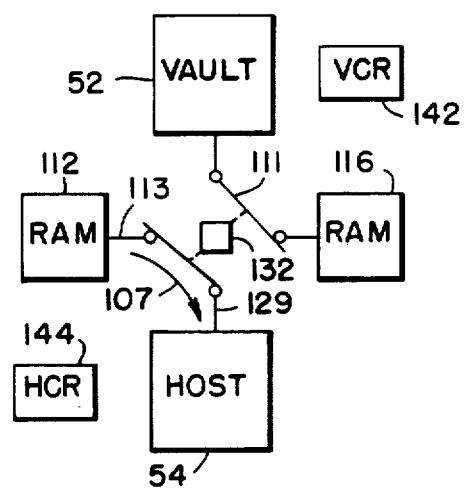

Referring now to FIG. 7d, it can be seen that after the termination of the code 121 write cycle (shown in FIG. 7c) the connections made by switches 111 have been reversed by Control 132 such that RAM 112 is connected to Host 54 and RAM 116 is connected to Vault 52. Host 54 is enabled thereby to read the block of data 107 previously stored within RAM 112 by Vault 52, the data 107 being read via the HCTRL 86, HADRS 90 and HDATA 88 busses (shown collectively as bus 129), the bus 129 being coupled through switches 111 from the line 113 of RAM 112.

As may be appreciated, while Host 54 is reading data 107, Vault 52 may be simultaneously loading a further block of data (not shown) into RAM 116, the further block of data to be subsequently read by Host 54 after the data 107. Similarly, and referring to FIG. 7a, Host 54 may load a block of data (not shown) into RAM 116 simultaneously with the loading of RAM 112 by Vault 52.

The operation of Inter-CPU Interface 82, which is one aspect of the invention, provides several advantages over other CPU communication techniques.

One such advantage is that each CPU, namely CPU 58 and CPU 84, may write into and read from a communication RAM connected thereto without interference from the other CPU. Thus no arbitration of memory accesses is required and, hence, there is no additional memory access time incurred due to the operation of such arbitration.

Another advantage is that each CPU has access to the entire contents of the communication RA connected thereto, thereby simplifying the nature of the software program which controls such accesses.

A still further advantage of the Inter-CPU Interface 82 of the invention is that its use provides for additional security between the Host 54 and the Vault 52 inasmuch as access to the Vault 52 cannot be obtained unless the Vault 52 grants such access by writing to HCR 144. The aforementioned communication codes which are written by the Host 54 in order to gain access to vault data stored within the communication RAM may further be of an encrypted nature, thus even further ensuring the security of the vault data. It should also be noted that Host 54 has only limited access to the data within Vault 52, that access being restricted to the data provided by Vault 52 within a communication RAM. Thus, the possibility that Host 52 might purposely or inadvertently modify or erase the valuable accounting data stored within NVMRAM 68 or BBRAM 70 is avoided.

Figure 8:
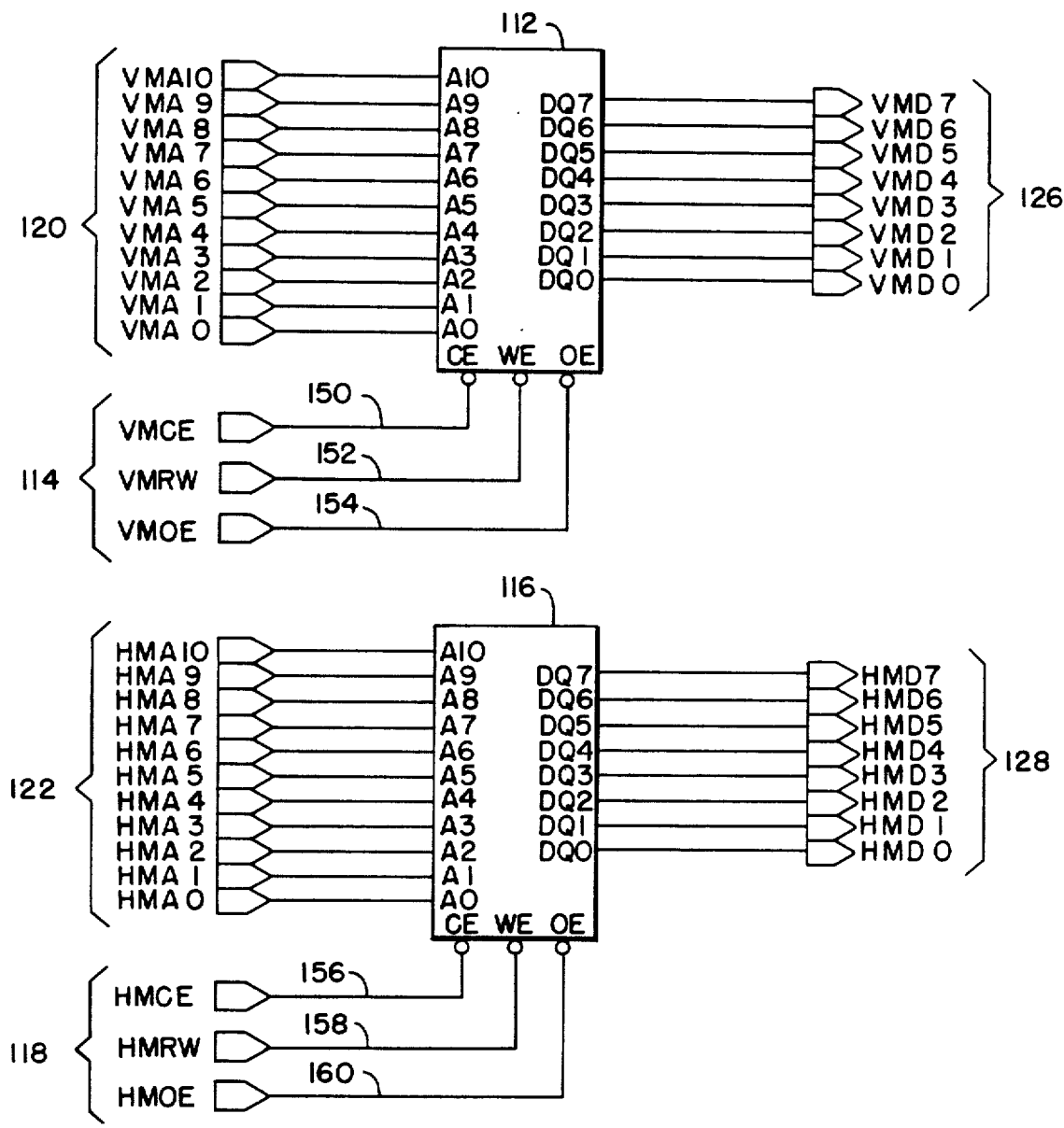
FIG. 8 is a schematic diagram of a portion of the Inter-CPU Interface of FIG. 6.
Figure 9A:
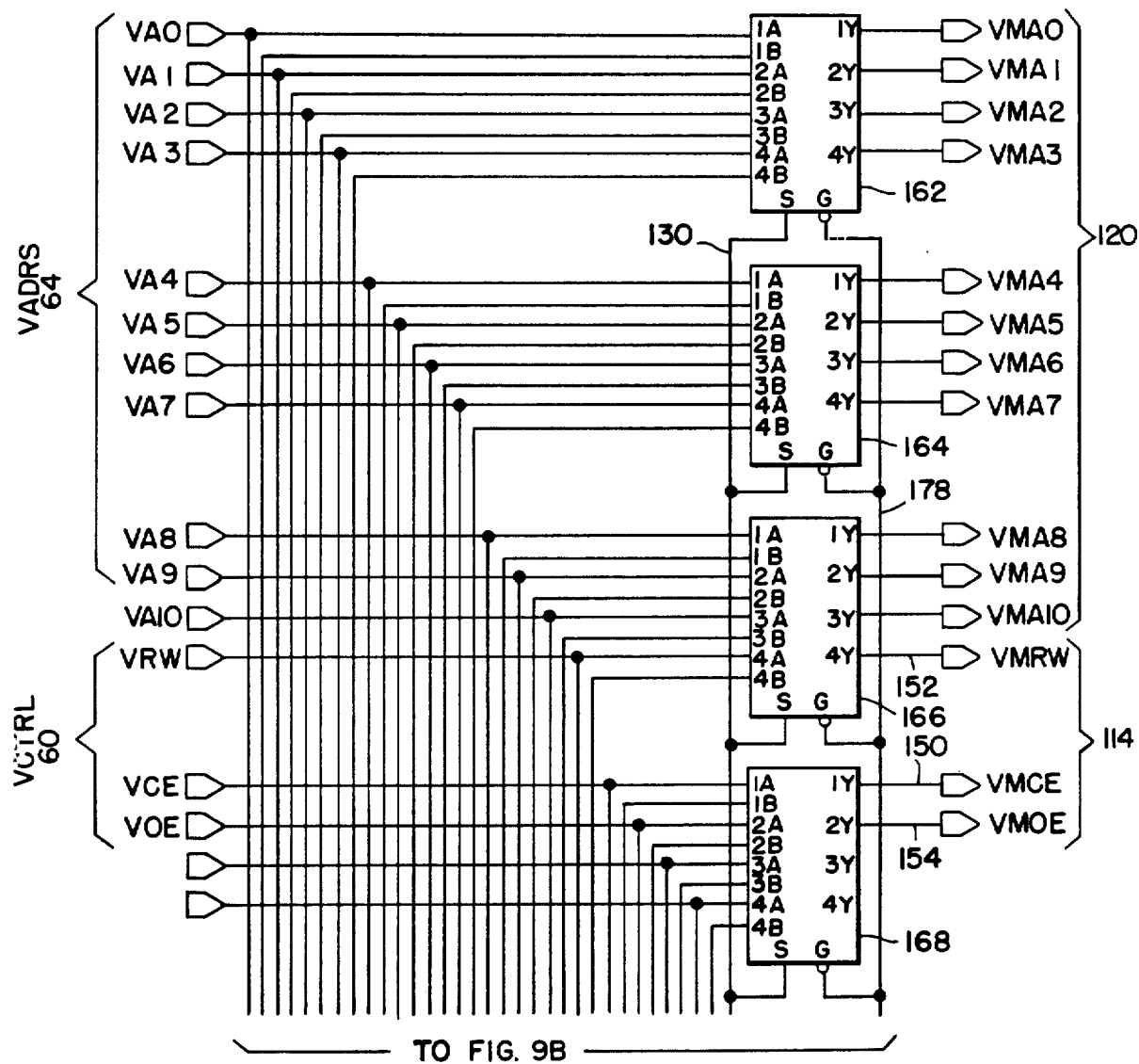
FIGS. 9a and 9b, referred to herein as FIG. 9, are a schematic diagram of another portion of the Inter-CPU Interface of FIG. 6.
Figure 9B:
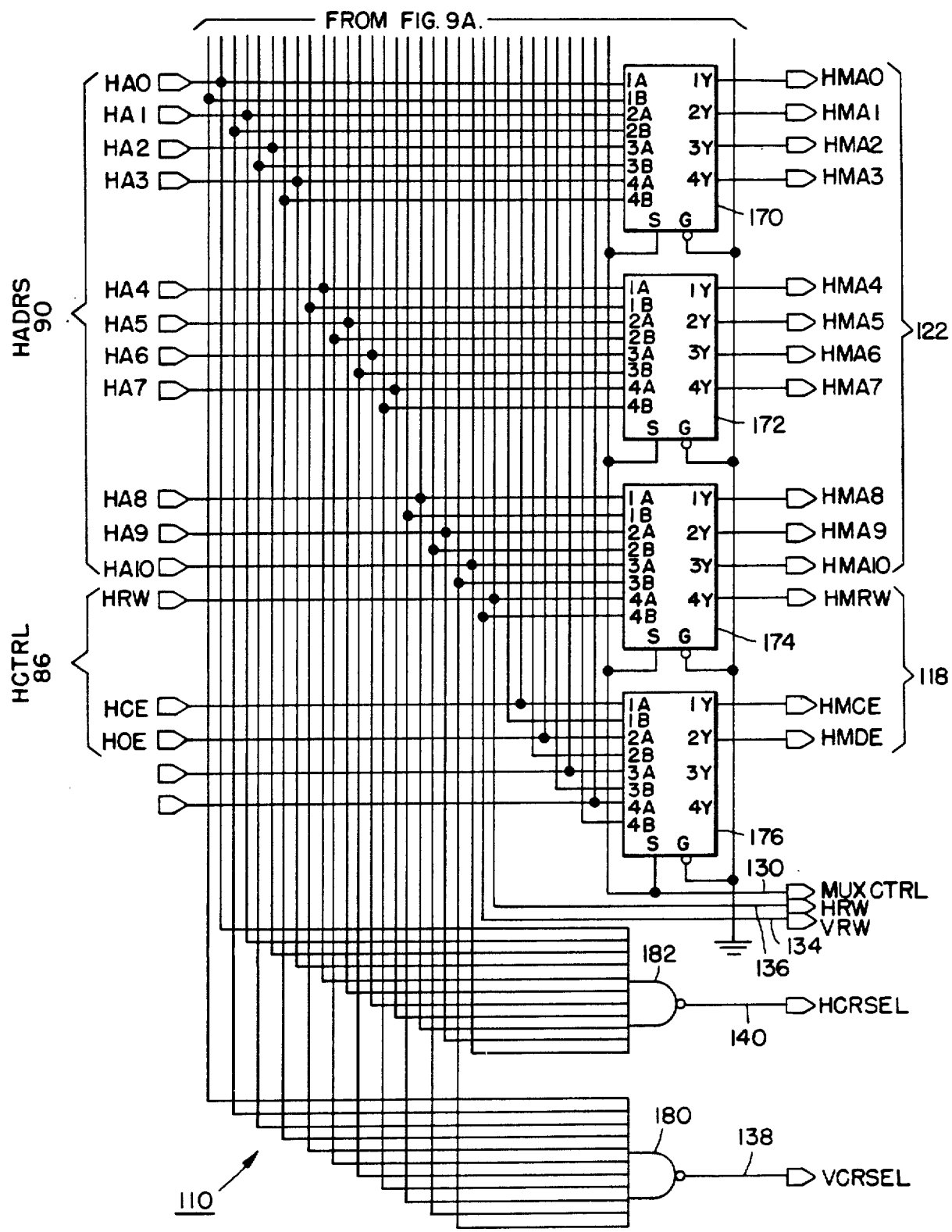
Figure 10A:
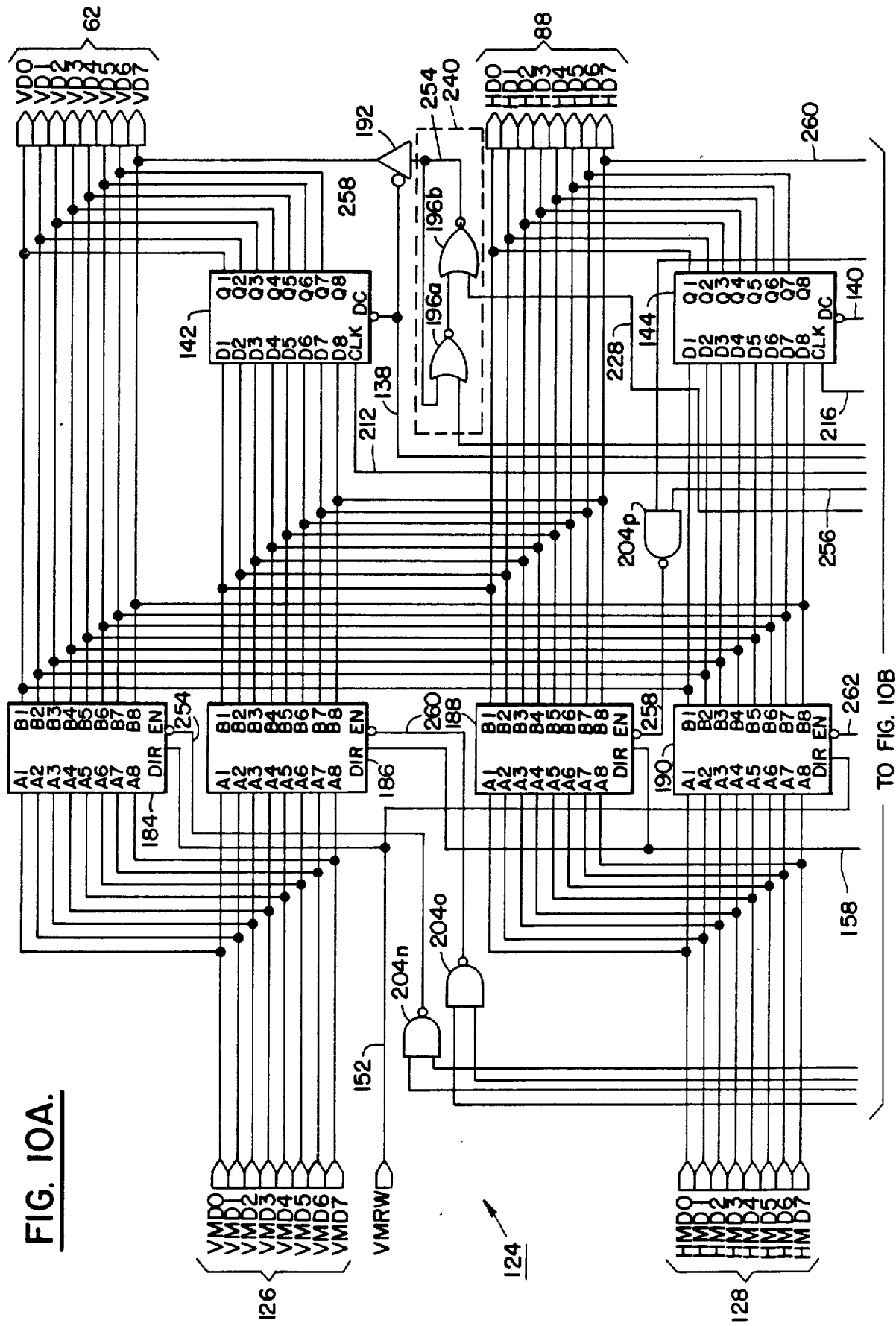

Referring now to FIGS. 8, 9 and 10 there is shown in schematic diagram form the Inter-CPU Interface 82. In order to facilitate the description of the operation of the logic circuits shown therein a logical one signal will be referred to as a "high" and a logical zero signal will be referred to as a "low". Also, if a signal is said to be asserted, it is assumed to be low. Similarly, if a signal is said to be deasserted, it is assumed to be high.

Referring first to FIG. 8 there is shown the communication RAM 112 and the communication RAM 116. By virtue of the eleven address lines connected to each, VMA0 to VMA10 and HMA0 to HMA10 respectively, RAM 112 and 116 are each capable of storing 2048 bytes of data only 2047 of which are used, as will be described below. In addition to the address busses 120 and 122, each RAM 112 and 116 further has a control bus 114 and 118, respectively, and a data bus 126 and 128, respectively.

Control bus 114 is comprised of signals VCME 150 (chip enable), VMRW 152 (read/write), and VMOE 154 (output enable), VMCE 150 being asserted selects the RAM 112 for operation. VMRW 152 being asserted in conjunction with VMCE 152, during a RAM write cycle, activates RAM 112 for storing the data present on data bus 126 within the location selected by address bus 120. VMOE 154 being asserted in conjunction with VMCE 150, during a RAM read cycle, activates a plurality of data bus drivers (not shown) within RAM 112, thereby causing them to output on data bus 126 the data within the location selected by address bus 120. The operation of address bus 122, control bus 118, and data bus 128 of RAM 116 including lines 156, 158 and 160, is identical to that described above in reference to RAM 112.

Referring now to FIG. 9 the address and control multiplexer 110 is shown to be comprised of a plurality of quad two input to one output multiplexers 162 through 176. In operation, such a multiplexer (for example multiplexer 162) will output from output 1Y either the data appearing at the 1A or 1B input, depending on whether the S(select) control input is high or low. Typically, when the S input is low, the data applied to the 1A input will appear on the 1Y output. When the S input is high, the data appearing on the 1B input will appear on the 1Y output. Correspondingly, the data appearing at the 2A or 2B inputs will appear on the 2Y output, etc.

As shown, multiplexers 162 through 168 have their A inputs connected to VADRS 64 and VCTRL 60, while the B inputs are connected to HADRS 90 and HCTRL 86. The Y outputs of multiplexers 162 through 168 are connected to the address bus 120 and the control bus 114 of RAM 112.

It may also be seen that the multiplexers 170 through 176 have their A inputs connected to HADRS 90 and HCTRL 86 and their B inputs connected to VADRS 64 and VCTRL 60. The Y outputs of multiplexers 170 through 176 are connected to the address bus 122 and the control bus 118 of RAM 116. Thus, it may be seen that when MUXCTRL 130, which is connected in common to the S control inputs of multiplexers 162 through 176, is low that the address bus 120 and control bus 114 of RAM 112 will be driven by VADRS 64 and VCTRL 60, respectively, through multiplexers 162 through 168. Similarly, the address bus 122 and control bus 118 of RAM 116 will be driven by HADRS 90 and HCTRL 86, respectively, through multiplexers 170 and 176. When MUXCTRL 130 is high, the opposite situation will occur, that is, RAM 112 will be driven by HADRS 90 and HCTRL 86 while RAM 116 will be driven by VADRS 64 and VCTRL 60. In order to permit multiplexers 162 through 176 to drive their respective outputs, an active low output enable pin of each multiplexer device is connected in common to a circuit ground via a line 178.

Multiplexer 110 is further comprised of a NAND gate 180 having eleven inputs, each one of which is connected to an address line VA0 through VA10 of VADRS 64. The output of gate 180 will be low when VADRS 64 equals address hexadecimal 7FF, thereby asserting the signal VCRSEL 138. Similarly, NAND gate 182 is connected to the individual address lines HA0 through HA10 of HADRS 90, thereby asserting HCRSEL 140 when HADRS 90 equals address hexadecimal 7FF. Thus, it may be seen that the address of the communication registers, namely VCR 142 and HCR 144, overlaps that of RAM 112 and 116. More specifically, the highest addressable location of each RAM is actually the address of a communication register VCR 142 or HCR 144. The purpose of such an address overlap will become apparent during the description of the Multiplexer Control 132.

Referring now to FIG. 10, the Data multiplexer 124 and the Multiplexer Control 132 are shown. Data Multiplexer 124 is comprised of four bus transceivers 184, 186, 188 and 190 for selectively coupling the data busses 126 and 128 of RAMS 112 and 116 to either the vault data bus VDATA 62 or the host data bus HDATA 88. The direction of data flow through transceivers 184 and 190 is selected by the state of the VMRW 142 line, the direction of data flow being from VDATA 62 to RAM 112 or 116 during a Vault 52 RAM write cycle (VMRW asserted). The flow of data through transceivers 184 and 190 is from RAM 112 or 116 to VDATA 62 during a Vault 52 RAM read cycle (VMRW high). Transceivers 186 and 188 are similarly controlled by the state of HMRW 158 to couple the host data bus HDATA 88 to either RAM 112 or 116.

The selection of which transceivers are activated, that is which have an Enable (EN) input low, is made by the state of MUXCTRL 130 in conjuction wtih inverter 198 and Nand gates 204n, 204o, 204p, and 204q.

As can be seen, when MUXCTRL 130 is low, the EN input of transceiver 184 is made low by the output 254 of gate 204n, in conjunction with the output 256 of inverter 198 and CCRSEL 138 being deasserted. Similarly, transceiver 188 is enabled by the output 260 of gate 204p in conjunction with output 256 and HCRSEL 140 being deasserted. Thus VDATA 62 is coupled to RAM 112 and HDATA 88 is coupled to RAM 116. MUXCTRL 130 being low forces a high on the outputs 260 and 262 of gates 204o and 204q, respectively, thereby disabling transceivers 186 and 190.

When MUXCTRL 130 is high, output 256 of inverter 198 is low, thereby disabling transceivers 184 and 188 through gates 204n and 204p, while simultaneously enabling transceivers 186 through gate 204n and transceiver 190 through gate 204q. Thus it can be seen that when MUXCTRL 120 is high that VDATA 62 is connected to RAM 116 through transceiver 190 and HDATA 88 is connected to RAM 112 through transceiver 186.

As was previously mentioned, the addresses of VCR 142 and HCR 144 overlap that of RAMS 112 and 116. In order to prevent a bus contention situation when the Vault 52 or the Host 54 reads its respective communication register, it is necessary to disable transceivers 184 through 190 during this time. This is accomplished by the VCRSEL 138 and HCRSEL 140 signals being included as inputs to gates 204n through 204q.

For example, VCRSEL 138 is asserted during a Vault 52 read of VCR 142. VCRSEL 138 is applied to the output control of VCR 142 to enable the bus drivers within to drive VDATA 62, thereby outputting the data previously stored within VCR 142 by Host 54. Both Vault transceivers, namely 184 and 190, are disabled when VCRSEL 138 is asserted by the outputs 254 and 262 being forced high. Thus, only VCR 142 will be enabled to drive VDATA 62. During a Host 54 read of HCR 144 the signal HCRSEL 140 being asserted similarly disables transceivers 186 and 188 via gates 204o and 204p, thereby allowing HCRSEL 140 to enable only HCR 144 to drive HDATA 88.

Referring now to the Multiplexer Control 132 shown in the lower portion of FIG. 10B it can be seen that Control 132 is comprised of a combinatorial logic block having a variety of logic elements types interconnected to perform the intended function. Basically, that function is to control the state of signal MUXCTRL 130 in order to selectively couple RAMS 112 and 116 to either the Vault 52 or Host 54. Another function provided by Control 132 is to control the operation of communication registers 142 and 144 and, additionally, to execute an interchange of RAMS 112 and 116 when each of the communication registers 142 and 144 have been written to by the Host 54 and Vault 52, respectively.

As may be seen in FIG. 10, Control 132 is further comprised of a first and a second set-reset flip-flop (SRFF) 221 and 223 which are comprised of cross-coupled Nand gates 204c, 204d, 204e and 204f. SRFF 221 has an output 222 and SRFF 223 has an output 224. In addition, Control 132 has a flip-flop (FF) 225 comprised of Nand gates 204g through 204l and inverters 202c, 202d and 202e. An output 226 of FF 225 is provided by XOR gate 208 and Nand gate 204m.

In order to facilitate the description of the operation of Control 132 it will be assumed that MUXCTRL 130 is low, thereby coupling Vault 52 to RAM 112 and Host 54 to RAM 116, as has been previously described. It will also be assumed that outputs 222 and 224 are low and that output 226 is high.

Assuming now that Host 54 desires to initiate a RAM interchange Host 54 would write an appropriate code to VCR 142. This is accomplished when Host 54 places data on HDATA 88 and asserts HCRSEL 140 in conjunction with HRW 136, it being remembered that these two signals are asserted when Host 54 addresses RAM address 7FF during a write cycle. HRW 136 and HCRSEL 140 being asserted cause the output 212 of OR gate 200b to go low, which output being low is inverted by inverter 202b to appear as a high at inverter 202b output 228.

Output 228 is connected to one input of OR gate 200d, the other input of gate 200d being connected to output 224 of SRFF 223, which output 224 low at this time. The application of the high output 228 causes the output 230 of gate 200d to become high, which output 230 is applied to one input of Nand gate 204b. The other input of gate 204b is connected to output 226 of FF 225, which output 226 is high at this time. Both inputs of gate 204b being high will cause the output 232 to become low, which in turn causes the output 224 of SRFF 223 to change state and become high. This high is fed back to OR gate 200d so that at the completion of the Host 54 write cycle the output 224 will remain high. The completion of the Host 54 write cycle causes output 212 to return high. The rising edge of this signal on output 212 activates the CLK input of VCR 142, thereby causing register 142 to store the aforementioned data code present on HDATA 88.

At the completion of the above described host write cycle the Control 132 may be said to be "armed", that is, a subsequent write to HCR 144 will cause the MUXCTRL 130 to change state, thereby activating Multiplexers 110 and 124 to interchange, or "swap" the RAMS 112 and 116 between the Vault 52 and the Host 54.

In order to write to HCR 144 Vault 52 asserts VCRSEL 138 in conjunction with VRW 134, the assertion of these two signals causing the output 216 of OR gate 200a to go low. The low on output 216 is inverted by inverter 202a and is applied as a high to an input 234 of OR gate 200c. The output 236 of OR gate 200c is applied to an input of NAND gate 204a, the other input of Nand gate 204 being already in a high state due to the output 226 of FF 225. The output 238 of Nand 204a consequently goes low, which output 238 causes the output 222 of SRFF 221 to become high. This high is fed back to OR gate 200c so that at the completion of the Vault 52 write cycle the output 222 will remain high.

Four input Nand gate 206 has as its inputs the output 222 of SRFF 221, output 224 of SRFF 223, output 212 of OR gate 200b and the output 216 of OR gate 200a. Thus it may be seen that immediately subsequent to the above described Host 54 and Vault 52 write cycles that the output 220 of Nand gate 206 will become high. The output 220 is applied as the sole input to FF 225 and, additionally, is an input to a vault interchange status latch 240 comprised of NOR gates 196a and 196b and, also, a host interchange status latch 242 comprised of NOR gates 196c and 196d.

The purpose of status latch 240 is to provide an indicator, or status, bit to Vault 52. The state of the status bit is indicative of whether the Host 54 has written a status word to VCR 142 and, additionally, whether a memory interchange has occurred.

In operation, an output 254 of status latch 240 is normally high due to the normal state of the inputs to NOR gates 196a and 196b. As can be seen, one input to NOR 196b is output 228 of inverter 202b, which output goes high only during a Host 54 write cycle to VCR 142.

The output 254 of NOR 196b is normally high, which output is applied as an input to a bus buffer 192 and, additionally, as an input to NOR 196a. The other input to NOR 196, as has been previously mentioned, is the normally low output 220 of AND gate 206. During a Host 54 write cycle to VCR 142 output 228 will be high, which output 228 will cause output 254 to become low. This low, being fed back to NOR 196a, will cause the output 254 to remain low after the aforementioned Host 54 write cycle. The output 258 of buffer 192 is connected to VD7 of VDATA 62. An enable input of buffer 192 is connected to output 138, which output is low during a Vault 52 read of VCR 142. Thus, the status word read back from VCR 142 is comprised of seven bits of data stored within VCR 142 by Host 54 and, additionally, an eighth bit of data which is the state of the status latch 142. By monitoring the state of output 258 Vault 52 is able to determine whether the Host 54 has written to VCR 142, thus arming, or initiating, a memory interchange.

Status latch 240 is reset to its normally high output condition when the output 220 of AND gate 206 becomes high, the output 220 being high during a memory interchange, as will be described more fully below. Thus the Vault 52 may also determine, by monitoring the output 258, when a memory interchange has occurred.

The operation of status latch 242 is similar to that of status latch 240. As can be seen, output 234 is connected as an input to NOR gate 196d for changing the output 256 of latch 242, the state of output 256 being made available to Host 54 through bus buffer 194 output 260.

In order to facilitate the description of the operation of FF 225 reference will be made to the following four tables, namely TABLE 1 through TABLE 4, wherein the output states of certain logic devices are shown. The following initial conditions will be assumed, the initial conditions being shown in TABLE 1 as follows: FF 225 output MUXCTRL 130 is low, output 226 is high, and the output 220 of NAND 206 is low.

Referring now to TABLE 2 it can be seen that when the output 220 becomes high, indicating that both the Vault 52 and Host 54 have written to Communication Registers 144 and 142, respectively, that FF 225 causes MUXCTRL 130 to change from the low to the high state. Thus, the Multiplexers 110 and 124 are caused to connect Vault 52 to RAM 112, as has been described above. It can further be seen that output 226 is caused to go low. The output 226 becoming low in turn causes both of the SRFF's 221 and 223 to reset, thereby causing outputs 222 and 224 to also go low. Inasmuch as outputs 221 and 223 are inputs to NAND 206, the output 220 also returns low. Thus, soon after output 220 becomes high it returns to a low condition due to the action of FF 225. The interval of time that output 220 remains high is determined by the propagation delays of the logic elements comprising FF 225 and SRFF's 221 and 223, a typical time delay being 50 nanoseconds.

Referring now to TABLE 3 there is shown the states of the various outputs comprising FF 225 immediately after output 220 returns low. As can be seen, MUXCTRL 130 remains in the high state which is a desired result. It can also be seen that output 226 has returned to the high state, thereby enabling SRFF's 221 and 223 to be once again set by the Vault 52 and Host 54.

Referring now to TABLE 4 there is shown a further memory interchange cycle wherein Vault 52 and Host 54 have once again written to Communication Registers 144 and 142, respectively. As can be seen, MUXCTRL 130 once again becomes low, thereby activating Multiplexers 110 and 124 as has already been described. As can also be seen output 226 is low once again, which low will reset SRFF's 221 and 223, as was described above in reference to TABLE 2.

TABLE 1

| OUTPUT | STATE |
|---|---|
| 130 | LOW |
| 220 | LOW |
| 244 | HIGH |
| 245 | HIGH |
| 246 | HIGH |
| 247 | LOW |
| 248 | HIGH |
| 249 | LOW |
| 250 | HIGH |
| 251 | HIGH |
| 252 | LOW |
| 226 | HIGH |

TABLE 2

| OUTPUT | STATE |
|---|---|
| 130 | HIGH |
| 220 | HIGH |
| 244 | LOW |
| 245 | HIGH |
| 246 | HIGH |
| 247 | LOW |
| 248 | HIGH |
| 249 | HIGH |
| 250 | LOW |
| 251 | HIGH |
| 252 | HIGH |
| 226 | LOW |

TABLE 3

| OUTPUT | STATE |
|---|---|
| 130 | HIGH |
| 220 | LOW |
| 244 | HIGH |
| 245 | HIGH |
| 246 | LOW |
| 247 | HIGH |
| 248 | LOW |
| 249 | LOW |
| 250 | HIGH |
| 251 | LOW |
| 252 | LOW |
| 226 | HIGH |

TABLE 4

| OUTPUT | STATE |
|---|---|
| 130 | LOW |
| 220 | HIGH |
| 244 | LOW |
| 245 | LOW |
| 246 | HIGH |
| 247 | HIGH |
| 248 | LOW |
| 249 | HIGH |
| 250 | HIGH |
| 251 | HIGH |
| 252 | HIGH |
| 226 | LOW |

Although the Inter-CPU Interface 82 has been described above as being comprised of discreet logic elements, it should be appreciated that the circuitry contained therein is suitable for fabrication as an integrated circuit (IC) wherein the individual logical devices such as NAND gates and inverters are fabricated on a common substrate contained within a single circuit package. It may also be appreciated that the circuitry which comprises Vault 52 may also be fabricated as one or more IC devices, thereby achieving a reduction of size, power consumption and manufacturing cost. Additionally, such an IC device or devices are amenable to packaging within a variety of small, low cost enclosures.

Figure 11:
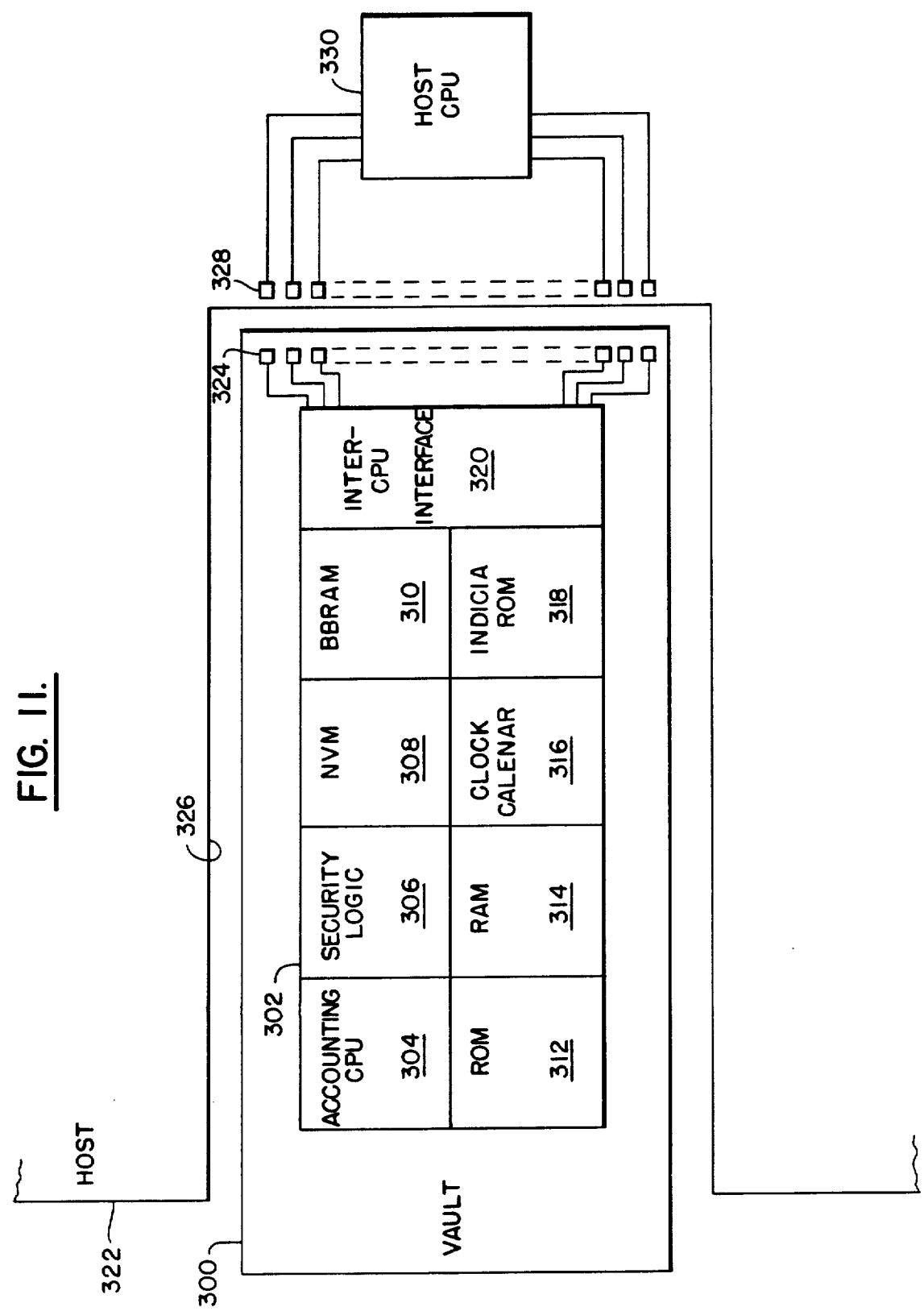
FIG. 11 is a block diagram of another embodiment of the postal mailing system.

One such Vault enclosure 300 is shown in FIG. 11. wherein the Vault 52 circuits are integrated into a single LSI (large scale integrated) circuit 302 having the functionality of the Vault 52 of FIG. 5. As may be seen, circuit 302 is comprised of a microprocessor 304, security logic 306, NVM 308, BBRAM 310, program ROM 312, scratchpad RAM 314, clock/calendar 316, and an indicia ROM 318. In addition, circuit 302 is comprised of an Inter-CPU Interface 320 for communicating with a host system 322, which system may be a mailing machine having a high speed ink jet printer module (not shown) for applying postage indicia to a document (not shown).

Enclosure 300 may have the physical dimensions of a typical credit card and be comprised of laminations of a rigid or semi-rigid insulating material to both protect the device 302 from environmental contamination and also provide electrical isolation. Enclosure 300 may also have a plurality of conductors 324 exposed upon an external surface to couple the Inter-CPU Interface 320 to the host 322.

In operation, module 300 may be inserted within a mating enclosure 326 provided within host 322, the conductors making contact with a plurality of similar conductors 328 for coupling the host CPU 330 to the vault LSI circuit 302.

The advantages of containing the vault electronics within such a credit card-like enclosure are several. Firstly, the small size of the resultant vault would make it suitable for low cost mass production techniques. Secondly, such a vault could easily be transported or even mailed to an appropriate postal facility in order to have the accounting data contained therein read and validated.

The above described embodiments can be modified in a variety of ways and those modifications would still be within the spirit and scope of the Applicants' invention. Thus, while this invention has been disclosed by means of specific, illustrative embodiments, the principals thereof are capable of a wide range of modification by those skilled in the art within the scope of the following claims.

What is claimed is:

1. A value printing system for the printing of indicia, each of said indicia having at least a given value, each of said indicia further having a fixed pattern to be printed together with said given value, said system comprising: first and second separate modules; secure metering means within the first module for maintaining a secure record of said given values printed, said secure metering means including a storage means of sufficient size for storing said pattern of said indicia within;

print control means within said second module and coupled to a printing means for printing said indicia, said print control means being operable upon receiving said fixed pattern from said metering means for enabling printing of the given value to occur; and communications means communicatively coupling together said metering means in said first module and said print control means in said second module, said communications means comprising means operable for communicating said pattern of said indicia stored in said storage means to said control means after which said control means enables the printing means to print said indicia.

2. A modular value printing system for the printing of indicia, each of said indicia having at least a given value, each of said indicia further having a fixed pattern to be printed together with said given value, said system comprising:

a secure metering module for maintaining a record of said given values printed, said secure metering module including a storage means of sufficient size for storing said fixed pattern of said indicia within;

a separate print control module coupled to a printing means for printing said indicia, said print control module being operable upon receiving said pattern from said metering module for enabling printing of the given value to occur; and the metering module having communications means communicatively coupling together said metering module and said print control module, said communications means comprising means operable for communicating said pattern of said indicia stored in said storage means to said control module whereby said control module is operable for causing the printing means to print said indicia.

3. A modular value printing system for the printing of indicia, each of said indicia having at least a given value, each of said indicia further having a fixed pattern to be printed together with said given value, said system comprising:

a secure metering module comprising a nonvolatile memory means and a first processing means for maintaining within said nonvolatile memory means a record of said given values printed, said secure metering module further comprising a storage means of sufficient size for storing said fixed pattern of said indicia within;

a print control module comprising a second processing means coupled to a printing means for controlling the printing of said indicia, said second processing means comprising means for receiving said fixed pattern from said first processing means for enabling printing of the given value to occur; and communication means communicatively coupling said first processing means to said second processing means wherein said first and said second processing means communicate one with the other and said first processing means is able to transmit to said second processing means said fixed pattern of said indicia whereby said second processing means is made operable for causing the printing means to print said indicia.

4. The modular value printing system of claim 3 wherein said first and said second processing means are each a microcomputer.

5. The modular value printing system of claim 4 wherein said storage means is a memory device coupled to said first microcomputer whereby said first microcomputer may read said pattern of said indicia stored within for transmission to said second microcomputer.

6. The modular value printing system of claim 5 wherein said communication means comprises:

first read/write memory means and second read/write memory means each being operable for storing at least a portion of the pattern of said indicia during the transmission of said pattern from said first microcomputer to said second microcomputer;

means responsive to a first state of a control signal to couple said first read/write memory means to said first microcomputer and simultaneously couple said second read/write memory means to said second microcomputer, said means further being responsive to a second state of said control signal for coupling said first read/write memory means to said second microcomputer and simultaneously couple said second read/write memory means to said first microcomputer;

first communication register means connected to and operable to be read by said first microcomputer and a second communication register means connected to and operable to be read by said second microcomputer, said first communication register means further being connected to and operable for having data written therein by said second microcomputer, said second communication register means further being connected to and operable for having data written therein by said first microcomputer whereby said first and said second microcomputers communicate one with the other; and control means for changing the state of said control signal, said control means being responsive to said first micrcomputer writing to said second communication register means, said control means further being responsive to said second microcomputer writing to said first communication register means whereby when each of said microcomputer means writes to a respective one of said communication register means said control means is operable for changing the state of said control signal from the first state to the second state or from the second state to the first state.

7. A postal mailing system for the printing of indicia, each of said indicia having at least a given value of postage, each of said indicia further having a fixed pattern to be printed with said given value of postage, said system comprising:

first and second separate modules;

secure metering means within the first module for maintaining a record of said given values of postage, said secure metering means including a storage means of sufficient size for storing said pattern of said indicia within;

print control means within said second module and coupled to a printing means for printing said indicia, said print control means being operable upon receiving said pattern from said metering means for enabling printing of said indicia to occur; and communications means communicatively coupling together said metering means and said print control means, said communications means comprising means operable for communicating said pattern of said indicia stored in said storage means to said control means after which said control means enables the printing means to print said indicia.

8. A modular postal mailing system for the printing of indicia, each of said indicia having at least a given value of postage, each of said indicia further having a fixed pattern to be printed with said given value of postage, said system comprising;
- a secure metering module for maintaining a nonvolatile record of said given values of postage, said secure metering module including read-only storge means of sufficient size for storing said pattern of said indicia within;
- a print control module separate from said metering module for coupling to a printing means for printing said indicia, said print control module being operable for receiving said pattern from said metering module for enabling printing of said indicia to occur; and
- the metering module having communications means communicatively coupling together said metering module and said print control module, said communications means comprising means operable for communicating said pattern of said indicia stored in said storage means to said control module whereby said control module causes the printing means to print said indicia.

9. A modular postal mailing system for the printing of indicia, each of said indicia having at least a given value of postage, each of said indicia further having a fixed pattern, a meter number, and a validation code to be printed together with said given value of postage, said system comprising:
- a secure metering module comprising a first processing means for maintaining a record of said given values of postage within a nonvolatile memory means, said secure metering module further comprising a read-only storage means of sufficient size for storing said fixed pattern of said indicia within;
- said secure metering module further comprising means to generate a meter number and a validation code upon receiving the given value of postage;
- a separate print control module comprising a second processing means coupled to a printing means for controlling the printing of said indicia, said second processing means being operable upon receiving said pattern, said meter number, and said validation code from said first processing means for enabling printing of said indicia to occur; and
- communication means communicatively coupling said first processing means to said second processing means wherein said first and said second processing means communicate one with the other and whereby said first processing means is able to transmit to said second processing means said pattern, said meter number and said validation code of said indicia whereby said second processing means is made operable for causing the printing means to print said indicia.

10. The modular postal mailing system of claim 9 wherein said first and said second processing means are each a microcomputer.

11. The modular postal mailing system of claim 10 wherein said storage means is a memory device coupled to said first microcomputer and said first microcomputer includes means for reading said pattern of said indicia stored within the transmission to said second microcomputer.

12. The modular postal mailing system of claim 11 wherein said communication means comprises:
- first read/write memory means and a second read/write memory means each being operable for storing at least a portion of said pattern of said indicia during the transmission of said pattern from said first microcomputer to said second microcomputer;
- means responsive to first state of a control signal to couple said first read/write memory means to said first microcomputer and simultaneously couple said second read/write memory means to said second microcomputer, said means further being responsive to a second state of said control signal to couple said first read/write memory means to said second microcomputer and simultaneously couple said second read/write memory means to said first microcomputer;
- first communication register means connected to and operable to be read by said first microcomputer and second communication register means connected to and operable to be read by said second microcomputer, said first communication register means further being operable for having data written therein by said second microcomputer, said second communication register means further being operable for having data written therein by said first microcomputer whereby said first and said second microcomputers communicate one with the other; and
- control means operable for changing the state of said control signal, said control means being responsive to said first microcomputer writing to said second communication register means, said control means further being responsive to said second microcomputer writing to said first communication register means whereby when each of said microcomputers write to a respective one of said communication register means said control means is operable for changing the state of said control signal from said first state to said second state or from said second state to said first state.

13. A method of transferring a data block between a first processing means and a second processing means comprising the steps of:
- providing a first and a second read/write data storage means for storing the data block during the transfer;
- providing a control signal having first and second states;
- in response to a first state of the control signal, coupling the first processing means to the first data storage means and the second processing means to the second data storage means; in response to a second state of the control signal, coupling the first processing means to the second data storage means and the second processing means to the first data storage means;
- providing a first and a second read/write register means; generating a first write signal by the second processing means for storing command or process data from the latter in the first register means, the first register means further being operable for having the command or status data stored within read by the first processing means; generating a second write signal by the first processing means for storing command or process data from the latter in the second register means, the second register means further being operable for having the command or status data stored within read by the second processing means, whereby each of the first and second processing means communicate command or status data one to another; and providing a control circuit; upon activation of the first write signal or the second write signal, using the control circuit to change the control signal from the first state to the second state or from the second state to the first state.

14. The method of claim 13 further comprising the steps of:

storing the data block to be transferred within either the first or the second read/write data storage means, which one of which data storage means being determined by a current state of the control signal, the data block stored being provided by one of the first or the second processing means; and reading the data block previously stored by either the first or the second processing means, the data being read by the other one of the first or the second processing means.

15. The method of claim 14 wherein the first and the second processing means are each a microcomputer having an address bus, a data bus, and a control bus, and using the busses to store the data block within or read the data block from the read/write data storage means.

16. The method of claim 15 wherein the control bus of the first microcomputer is used for providing the first write signal and wherein the control bus of the second microcomputer is used for providing the second write signal whereby the state of the control signal may be changed by the control circuit, the control signal thereby being changed from the first state to the second state or from the second state to the first state.

17. A modular postal mailing system for the printing of indicia, each of said indicia having at least a given value of postage, each of said indicia further having a pattern printed with said given value of postage, said system comprising:

a host module coupled to a printing means for activating said printing means to print said indicia;

an electronic vault module separated from the host module and coupled to said host module, said vault module comprising a nonvolatile memory means for securely maintaining a record of said given values of postage, said vault module further comprising a storage means for maintaining a copy of said pattern of said indica, said copy being maintained securely within said vault module; and communications means coupling said host module to said vault module whereby said host module and said vault module communicate one to another and whereby said vault module transmits to said host module the copy of said pattern of said indicia thereby enabling said host module to activate said print means to print said indicia.

18. A value printing system for the printing of indicia, each of said indicia representative of a value, the value of an indicia printed being accounted for by said system, comprising:

a host module including means for controlling the printing of said indicia;

a printer module communicatively coupled to said host module for printing said indicia;

a valut module separated from but communicatively coupled to said host module, said vault module including means for accounting for the value of indicia printed, said vault module further including means for storing within a representation of said indicia, said vault module further including means for communicating said representation of said indicia to said host module; and a communications bus bidirectionally coupling together said vault module and said host module, said bus comprising a plurality of read/write memory devices and a control means therefore, said control means including means for interchangebly coupling said memory devices to said vault and said host modules whereby said vault module and said host module communicate one to the other by activating said control means to interchange said memory devices whereby the printing of said indicia is accomplished.

19. The modular postal mailing system of claim 17 further comprising means for removably coupling said vault module to said host module.

20. The modular postal mailing system of claim 19, further comprising means for disabling said host module from activating said printing means to print said indicia unless said vault module is coupled thereto.

21. The modular postal mailing system of claim 20 wherein said printing means is an ink jet printer operable for printing said indicia.

22. The modular postal mailing system of claim 21 wherein the copy of the pattern of said indicia has a type of format suitable for printing by said ink jet printer.

23. The modular postal mailing system of claim 22 wherein the type of format is a dot matrix type of format.

24. The modular postal mailing system of claim 17 wherein said pattern is a fixed pattern which is printed for each said indicia.

* * * * *